(12) United States Patent
Radino

(10) Patent No.: US 12,124,791 B2
(45) Date of Patent: Oct. 22, 2024

(54) SYSTEM AND METHOD FOR CREATING AND SENDING LETTERS TO INMATES

(71) Applicant: Jeremy Radino, Blue Point, NY (US)

(72) Inventor: Jeremy Radino, Blue Point, NY (US)

( * ) Notice: Subject to any disclaimer, the term of this patent is extended or adjusted under 35 U.S.C. 154(b) by 0 days.

(21) Appl. No.: 17/678,435

(22) Filed: Feb. 23, 2022

(65) Prior Publication Data

US 2023/0267270 A1 Aug. 24, 2023

(51) Int. Cl.
*G06F 40/00* (2020.01)
*G06F 40/106* (2020.01)
*G06F 40/114* (2020.01)
*G06F 40/166* (2020.01)

(52) U.S. Cl.
CPC .......... *G06F 40/166* (2020.01); *G06F 40/106* (2020.01); *G06F 40/114* (2020.01)

(58) Field of Classification Search
CPC ..... G06F 40/166; G06F 40/114; G06F 40/106
See application file for complete search history.

(56) References Cited

U.S. PATENT DOCUMENTS

| | | | | |
|---|---|---|---|---|
| 7,742,582 B2 * | 6/2010 | Harper | ................... | G06Q 50/26 379/88.19 |
| 7,804,941 B2 * | 9/2010 | Keiser | ................... | H04L 51/066 379/88.19 |
| 9,311,627 B1 * | 4/2016 | Shipman, Jr. | .......... | G06F 3/1238 |
| 9,742,935 B1 * | 8/2017 | Shipman, Jr. | .......... | G06F 3/1238 |
| 9,967,291 B1 * | 5/2018 | Hodge | .................... | H04L 51/42 |
| 2004/0215775 A1 * | 10/2004 | Murray, Jr. | ........... | G06F 9/5011 709/225 |
| 2010/0299761 A1 * | 11/2010 | Shapiro | ................... | H04L 63/06 726/28 |
| 2018/0048677 A1 * | 2/2018 | Grisham | ................ | G06F 3/1239 |
| 2018/0260926 A1 * | 9/2018 | Bambocci | .............. | G06Q 50/26 |
| 2018/0352076 A1 * | 12/2018 | Chang | .................... | G06Q 50/01 |
| 2019/0158989 A1 * | 5/2019 | Gebers | ................ | H04M 3/2281 |

* cited by examiner

*Primary Examiner* — Barbara M Level
(74) *Attorney, Agent, or Firm* — Meister Seelig & Fein PLLC

(57) ABSTRACT

A method and system for creating and sending letters to inmates, the system comprising a server configured to generate a front end via a web-based application on a client device, wherein the front end comprises a user interface allowing a user of the client device to create and send digital letter data to an inmate at a facility location. The server is further configured to store the digital letter data to a database and generate a location administration interface accessible by one or more users at the facility location to access the database, review content of the digital letter data, and print digital letter data that has been approved by the one or more users. The server is further configured to transmit the approved digital letter data to a printer at the facility location.

20 Claims, 3 Drawing Sheets

SYSTEM AND METHOD FOR CREATING AND SENDING LETTERS TO INMATES

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

Field of the Invention

This application generally relates to electronic message scanning and review, and in particular, capturing letters digitally and transmitting the content of the letters to a web host for approval and printing.

Description of the Related Art

Conventionally, communication with prison inmates is carried out via hand written letter. However, there is a large administrative overhead in managing postal mail. For example, letters to inmates are opened and reviewed to prohibit certain activities, such as issuing threats, sending inappropriate content, etc. Another shortcoming of the conventional communication means is lack of data retention as there is no backup methodology for the written communication, and they can be lost before being delivered. Receiving and distributing inmates' paper mail pose challenges to correction system authorities.

Thus, there is a need for sending communications, such as letters and mail, to correctional facilities or prisons, which are printed at the facility level that cannot be physically accessed by anyone outside the walls of a facility. A product is also needed for significantly reducing the chance of contraband from entering the prison system.

SUMMARY OF THE INVENTION

The present invention provides a method and system for creating and sending letters to inmates. According to one embodiment, the system comprises a server configured to generate a front end via a web-based application on a client device, wherein the front end comprises a user interface allowing a user of the client device to create and send digital letter data to an inmate at a facility location. The server is further configured to store the digital letter data to a database and generate a location administration interface accessible by one or more users at the facility location to access the database, review content of the digital letter data, and print digital letter data that has been approved by the one or more users. The server is further configured to transmit the approved digital letter data to a printer at the facility location.

The front end may include a list of facility locations including the facility location. The server may be further configured to receive inmate details associated with the digital letter data, the inmate details including an inmate name, identification number, and date of birth. The front end may include an editor display and space for entering text for the digital letter data. The editor display may include a real-time page count estimate.

The facility location may comprise a correctional facility, a restrained environment, and/or a restricted-access location. The server may be further configured to send email notifications to the client device indicating the digital letter data has been printed and delivered to the inmate. The server may be further configured to assess a fee for printing the digital letter data and delivering the printed digital letter to an inmate recipient. The server may be further configured to generate a centralized administration interface allowing an administrator to add facility locations, administrate a plurality of facility locations, add users for the centralized administrator interface, add print destinations, set defaults for each of the plurality of facility locations, and configure permission controls for each user of the plurality of facility locations. The location administration interface may include letter data search and filtering functionality.

According to one embodiment, the comprises generating, by a server, a front end via a web-based application on a client device, wherein the front end comprises a user interface allowing a user of the client device to create and send digital letter data to an inmate at a facility location. The digital letter data is stored to a database. A location administration interface is generated wherein the location administration interface is accessible by one or more users at the facility location to access the database, review content of the digital letter data, and print digital letter data that has been approved by the one or more users. The approved digital letter data is transmitted to a printer at the facility location. Inmate details associated with the digital letter data is received, wherein the inmate details including an inmate name, identification number, and date of birth. The front end may include an editor display and space for entering text for the digital letter data. The editor display may include a real-time page count estimate.

The facility location may comprise a correctional facility, a restrained environment, and/or a restricted-access location. Email notifications may be sent to the client device indicating the digital letter data has been printed and delivered to the inmate. A fee may be assessed for printing the digital letter data and delivering the printed digital letter to an inmate recipient. A centralized administration interface may be generated allowing an administrator to add facility locations, administrate a plurality of facility locations, add users for the centralized administrator interface, add print destinations, set defaults for each of the plurality of facility locations, and configure permission controls for each user of the plurality of facility locations. The location administration interface may include letter data search and filtering functionality.

According to one embodiment, the method comprises receiving user information from a client device of a message sender, initiating a letter creation session by confirming inmate details at a facility location and generating a message field or editor including space for text input by the message sender, generating letter data based on the text input in the message field or editor, saving the letter data for the letter creation session to a database, generating a preview and pricing based on the letter data, receiving a payment based on the pricing, and transmitting the letter data to the facility location.

BRIEF DESCRIPTION OF THE DRAWINGS

The invention is illustrated in the figures of the accompanying drawings which are meant to be exemplary and not limiting, in which like references are intended to refer to like or corresponding parts.

DETAILED DESCRIPTION OF THE INVENTION

Subject matter will now be described more fully hereinafter with reference to the accompanying drawings, which form a part hereof, and which show, by way of illustration, exemplary embodiments in which the invention may be practiced. Subject matter may, however, be embodied in a variety of different forms and, therefore, covered or claimed subject matter is intended to be construed as not being limited to any example embodiments set forth herein; example embodiments are provided merely to be illustrative. It is to be understood that other embodiments may be utilized and structural changes may be made without departing from the scope of the present invention. Likewise, a reasonably broad scope for claimed or covered subject matter is intended. Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

The present invention provides a method and system that allow communications to select locations in the form of digital letters. In particular, the select locations may comprise controlled environment facilities, such as prisons. Physical mail is often used to mule contraband, especially drugs, to jails across the country. As such, the disclosed method and system obviates contraband on physical letters.

The digital letters may be submitted by users and become available to site locations for review before subsequently being printed to be delivered to a recipient. The disclosed system may allow printing of the digital letters from designated printing locations, via designated user accounts using access controls. The system may include features to view past correspondence, whilst also allowing details to be updated for the user account. The system may comprise a network, a web server and a database, along with access to multiple cloud enabled printing devices.

Figure 1:
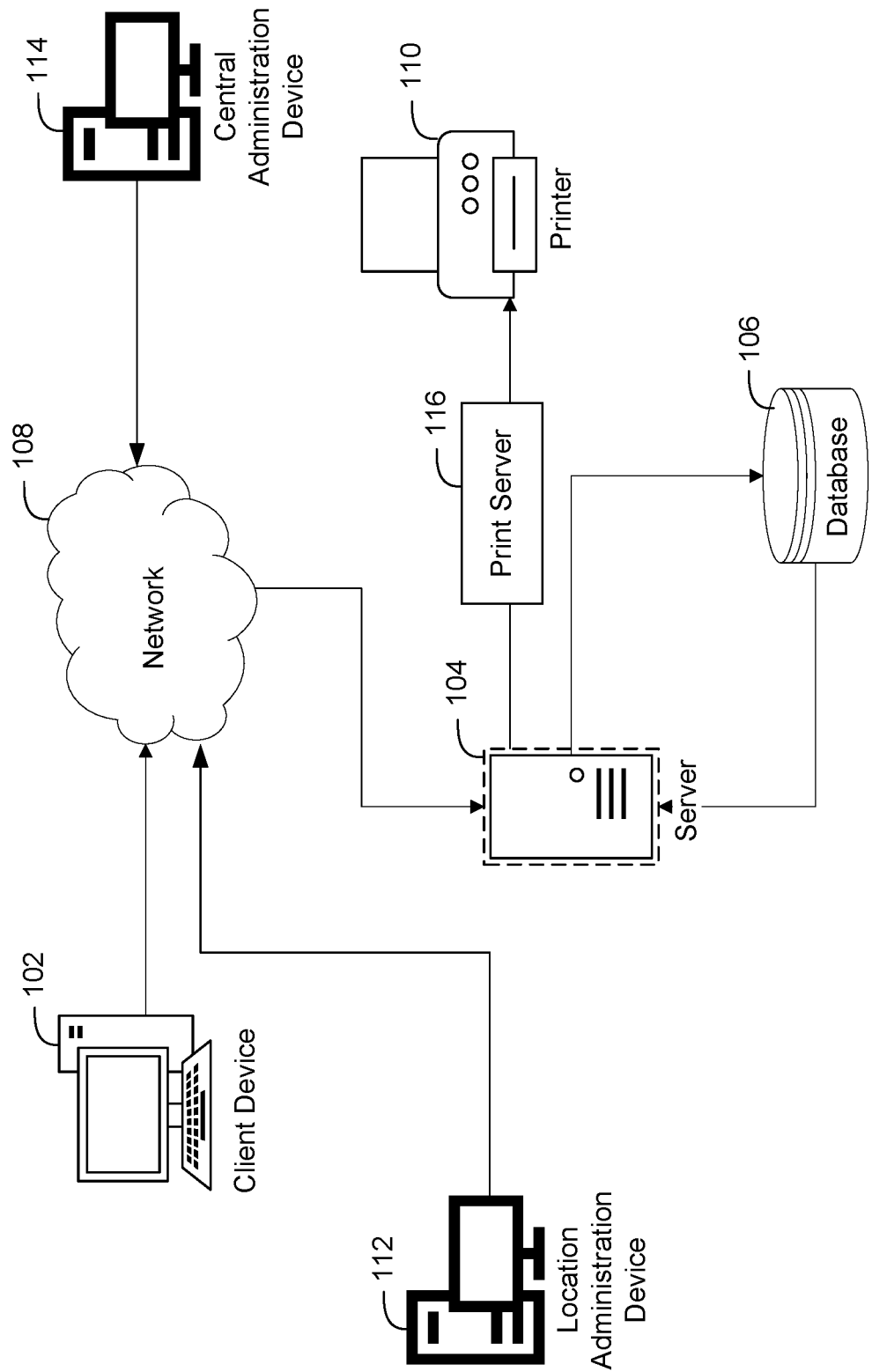
FIG. 1 illustrates a computing system according to an embodiment of the present invention.

FIG. 1 illustrates a computing system according to an embodiment of the present invention. The system presented in FIG. 1 includes client device 102, server 104, database 106, network 108, printer 110, location administration device 112, and central administration device 114. Client device 102 may comprise a computing device (e.g., desktop computers, terminals, laptops, personal digital assistants (PDA), cellular phones, smartphones, tablet computers, e-book readers, smart watches and smart wearable devices, or any computing device having a central processing unit and memory unit capable of connecting to a network). The client device 102 may also comprise a graphical user interface (GUI) or a browser application provided on a display (e.g., monitor screen, LCD or LED display, projector, etc.). The client device 102 may also include or execute an application to communicate content, such as, for example, textual content, multimedia content, or the like.

Client device 102 may include or execute a variety of operating systems, including a personal computer operating system, such as a Windows, Mac OS or Linux, or a mobile operating system, such as iOS, Android, or Windows Phone, or the like. The client devices 102 may include or may execute a variety of possible applications, such as a client software application enabling communication with other devices, such as communicating one or more messages, such as via email, short message service (SMS), multimedia message service (MMS), or messages on social network platforms including, for example, Facebook, LinkedIn, Twitter, Pinterest, Snapchat, or Instagram, to provide only a few possible examples.

According to an embodiment of the present invention, client device 102 may include a web-based application that connects to server 104. Server 104 may host a service allowing message senders to send letters to recipients at facility locations. A facility location may comprise a correctional facility, restrained environment and/or restricted-access location, such as a prison. The server 104 may include letter creation and transmission functionality that can be used by message senders desiring to write letters to inmates. The server 104 may allow message senders to store and review letter drafts. Message senders may receive email notification from server 104 indicating that their digital letters have been printed and delivered to inmate recipients.

Location administration device 112 may be used by users at the facility location to communicate with server 104 over network 108 to access and review the digital letters submitted by the message senders to the facility location. The letters or correspondence may be reviewed at the facility location on a computing device. After review, the digital letters may be printed at the facility location on printer 110 and physically delivered to a recipient. According to one embodiment, access and review of the digital letters may be restricted or toggled on and off by central administration device 114 depending on the facility. For example, correction officers can legally read mail at state and federal prisons but not at county jails. When letter review is enabled, digital letters may not be printed at a facility location until it is reviewed and approved by staff or investigators. Once approved, digital letters may be printed. If a letter is flagged it may be automatically placed in a separate folder for further evaluation or action.

Server 104 may connect to one or more of cloud-enabled print server 116 coupled to one or more of printer 110 at a designated printing site at the facility location, e.g., via a cloud print service. In one embodiment, print server 116 may comprise one or more Raspberry Pi computers. Print server 116 may receive print jobs from server 104 and send the jobs to an appropriate printer 110. Database 106 may comprise one or more storage memory devices used as repositories of electronic data (e.g., digital letters) to be delivered to inmates. The database 106 may include an organized collection of information structured such that a web application can search and retrieve electronic data therefrom. The disclosed system may route letters or other correspondence by using a table in the database 106 that indicates a recipient's name, identification number, and facility location.

Server 104, as described herein, may vary widely in configuration or capabilities but is comprised of at least a special-purpose digital computing device including at least one or more central processing units and memory. For example, server 104 may comprise a PHP driven site, utilizing jQuery and Bootstrap whilst integrating with Stripe and Google Pay for payment functionality. The server 104 may also include one or more of mass storage devices, power supplies, wired or wireless network interfaces, input/output interfaces, and operating systems, such as Windows Server, Mac OS X, Unix, Linux, FreeBSD, or the like. In an example embodiment, server 104 may include or have access to memory for storing instructions or applications for the performance of various functions and a corresponding processor for executing stored instructions or applications. For example, the memory may store an instance of the server configured to operate in accordance with the disclosed embodiments.

Network 108 may be any suitable type of network allowing transport of data communications across thereof. The network 108 may couple devices so that communications may be exchanged, such as between servers and client devices or other types of devices, including between wireless devices coupled via a wireless network, for example. Network 108 may also include mass storage, such as network attached storage (NAS), a storage area network (SAN), cloud computing and storage, or other forms of computer or machine readable media, for example. In one embodiment, the network 108 may be the Internet, following known Internet protocols for data communication, or any other communication network, e.g., any local area network (LAN) or wide area network (WAN) connection, cellular network, wire-line type connections, wireless type connections, or any combination thereof. Communications and content stored and/or transmitted to and from client device 102 and server 104 may be encrypted using, for example, the Advanced Encryption Standard (AES) with a 128, 192, or 256-bit key size, or any other encryption standard known in the art.

The server 104 may generate a front end for message senders, a location administration interface for users at facility locations to review and print the letters, and a centralized administration interface for management of the server and facility locations. The front end may comprise a user interface via a web-based application executing on client device 102. The front end may include a login/registration interface for setting up and accessing an account via, e.g., an email address and password. Once logged in, the front end may allow message senders to draft and send letters using a "wizard driven" interface. For example, the interface may include a drop down list or menu of enrolled facility locations for allowing a message sender to send a digital letter to. The message sender may then provide inmate details including an inmate name, identification number, and date of birth. The interface may further include an editor display for typing a letter. The editor may comprise a space for text of a letter or correspondence. The editor may also include a real-time page count estimate, e.g., for fee purposes.

While typing a letter, the message sender may be presented with a preview of the letter with accurate page count, along with details of recipient. A fee may be assessed for printing and delivering the letter to an inmate recipient. Payment options may be presented to the message sender. The payment options may include credit card, Stripe, PayPal, or other payment methods. Upon entering payment information, a payment gateway may return with success or failure, both showing details relevant. If successful, a confirmation of purchase may be emailed to the message sender. Past purchases may be viewed by the number of pages and destination, price, etc. However, due to security reasons, inmate name and identification may be omitted from past purchase details.

The centralized administration interface may be accessed from central administration device 114 to allow for an administrator of the disclosed system to add facility locations, administrate the facility locations (e.g., to act as a local admin for that site to add/remove operators, set printer etc.), add users for the centralized administrator interface, add print destinations/set defaults for each facility location, and configure permission controls per user per location. The centralized administration interface may further provide tracking and alerting of unusual activity, such as a user sending letters to more than one location. The centralized administration interface may also generate an overview of all letters sent to all sites as well as view sender details per letter (e.g., Internet Protocol ("IP") address, payment information).

The location administration interface may be accessed from location administration device 112 and include functionality to present the letters for review at a given facility location by designated users. A list of sortable/paginated letters may be provided for review by one or more users at the location. Content and details (IP address, payment information) of each of the letters may be viewed by the one or more users. A status of each letter may be maintained by server 104. Letter status may indicate whether a letter has been retrieved and reviewed by a reviewer, approved, denied, held for further review (e.g., criminal investigations), printed, and delivered. Users may mark or change the status of letters using the location administration interface. If a letter is approved, the digital letter may be printed via a default printer for the facility location.

The location administration interface may also filter a list of received letters. Received letters may be filtered by sender, recipient, date range, as well as status, e.g., printed, queued, error. The interface may also allow keyword, phrase, or wildcard searches on the letters. For example, digital letters may be searched for certain words to determine if a letter contains content or evidence of activity of interest to an authority or investigator. Delivery of the letter may be based on information found when searching the message, e.g., letters containing any or a certain amount of content may be denied delivery. The location administration interface may further indicate whether letters have been previously reviewed and by whom. The location administration interface may also be configured to retrieve letters sent by specific message senders and view a list of letters that a specific inmate has received.

Automated alerts may be configured via the location administration interface for instances where a single inmate receives a large volume of letter, such as 20 letters in one month. The automated alerts may be configurable (e.g., volume and alert frequency) for each location. The location administration interface may also allow operators to add printers, set price per page, and specify print destination at the given facility.

Figure 2:
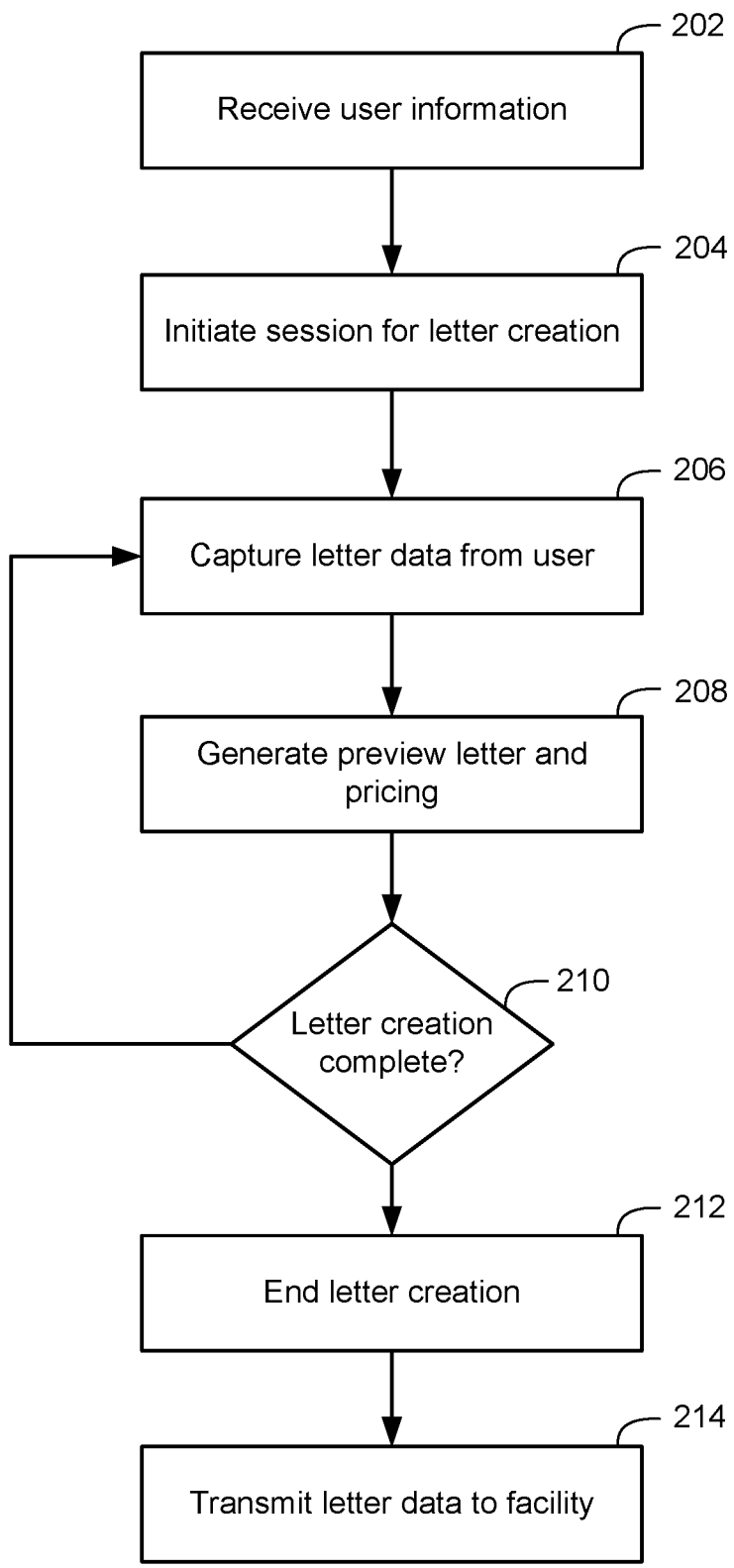
FIG. 2 illustrates a flowchart of a method for creating digital letters according to an embodiment of the present invention.

FIG. 2 illustrates a flowchart of a method for creating digital letters according to an embodiment of the present invention. A user may use a client device to connect to a server hosting a letter creation service for sending to inmates. User information is received by the server, step 202. The user information may comprise login information, such as a username or email address and password.

A letter creation session is initiated, step 204. The letter creation session may be initiated by the server to allow a user to send a digital letter to inmates at any of given facility locations that are enrolled with the server. Initiating the letter creation session may include prompting the user to select a facility location from a list and provide inmate details, such as an inmate name, identification number, and date of birth. The server may retrieve a roster of inmates from the chosen facility location and confirm the inmate details. Upon confirming the inmate details, a message field or editor may be generated on the client device of the user. The message field or editor may include a space for text for the user to enter.

Letter data is captured from the user, step 206. Letter data may be generated via the message field or editor as the user is entering text. Capturing the letter data may comprise transmitting the letter data from the client device to the server and caching or saving the letter data to the letter creation session on a database. A preview of the letter and pricing is generated, step 208. The message field or editor may include a print view and a real-time page count estimate, e.g., for fee purposes.

The server determines whether the letter creation is complete, step 210. For example, the user may finalize and submit the letter for sending to the inmate. The server may charge a fee for sending the letter and finalizing the letter may include submitting payment information. If letter creation is not complete, the server continues to capture letter data at step 206. Otherwise, letter creation is ended, step 212. The letter data is transmitted to a facility location associated with the inmate, step 214.

Figure 3:
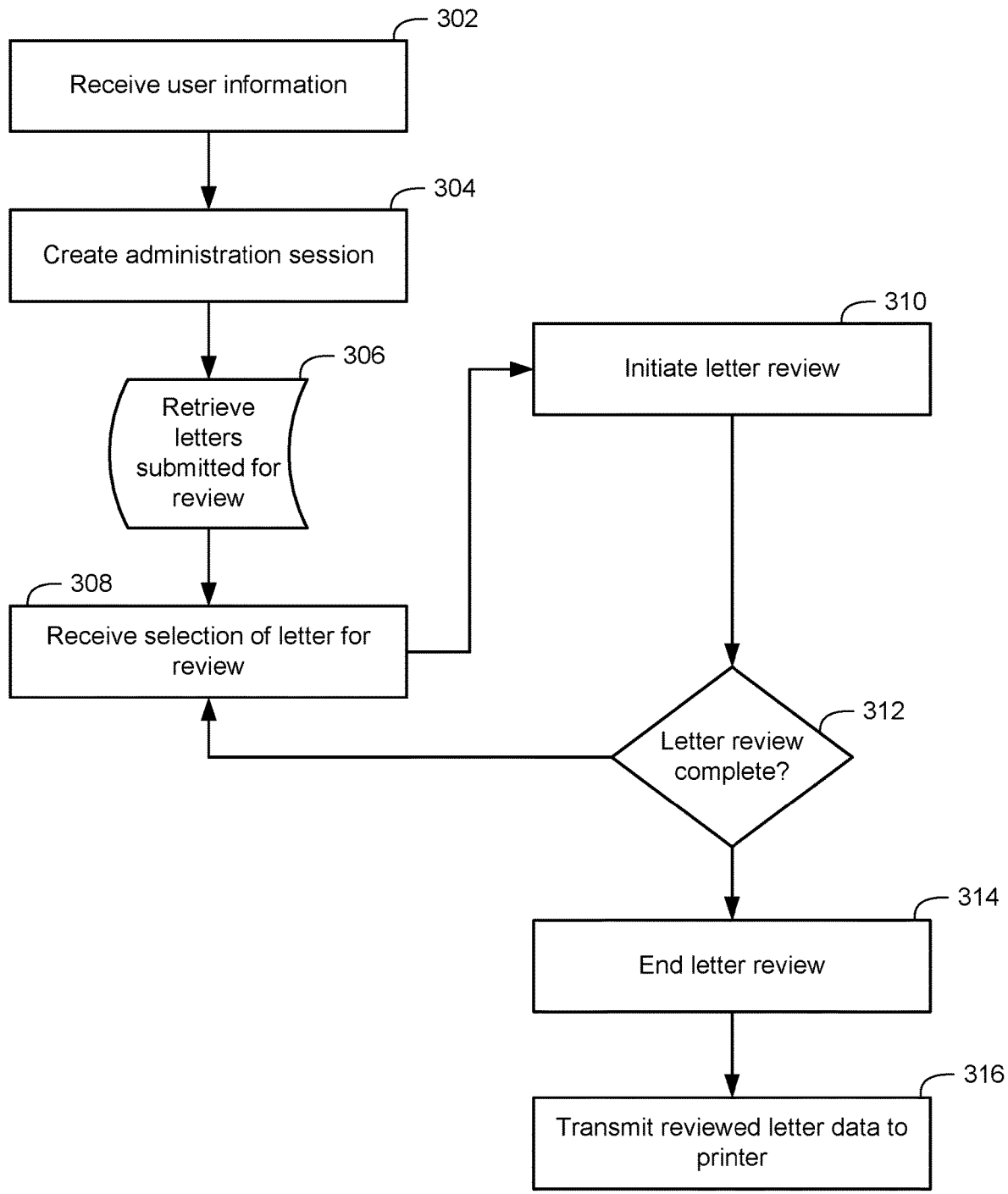
FIG. 3 illustrates a flowchart of a method for processing digital letters according to an embodiment of the present invention.

FIG. 3 illustrates a flowchart of a method for processing digital letters at a facility location according to an embodiment of the present invention. Letter data may be received at given facility locations based on the intended inmate recipient of the letter data. The letter data may be screened or reviewed prior to printing and delivery to inmates. Users at a facility location may use a client device to connect to the server hosting the letter creation service to access and review the letter data. User information is received by the server, step 302. The user information may comprise login information, such as a username, employee identification, or email address and password.

Create administration session, step 304. The administration session may comprise an interface created by the server to allow a user to access digital letters received by a given facility location that is enrolled with the server. Letters submitted to the facility location are retrieved for review, step 306. Letters received by the facility location may be presented in a list of sortable/paginated letters. A selection of letter for review is received, step 308. The user may select a given letter from the list of letters to review. Additionally, each letter may be assigned a letter status indicating whether the letter has been reviewed, approved, denied, held for further review (e.g., criminal investigations), printed, or delivered.

Letter review is initiated, step 310. Content and details of each of the letters may be reviewed by the user. Users may mark or change the status of letters during letter review. The server determines whether letter review is complete, step 312. If not, the server continues to receive a selection of a letter for review at step 308. Otherwise, the letter review is ended, step 314. Reviewed letter data is transmitted from the server to a printer, step 316. The printer may comprise one or more printing devices at the location of the facility location. The printer may comprise an Internet connected printer utilizing a cloud printing service that allows the user to print from any device on a computing network at the facility location.

FIGS. 1 through 3 are conceptual illustrations allowing for an explanation of the present invention. Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps). In software implementations, computer software (e.g., programs or other instructions) and/or data is stored on a machine-readable medium as part of a computer program product and is loaded into a computer system or other device or machine via a removable storage drive, hard drive, or communications interface. Computer programs (also called computer control logic or computer-readable program code) are stored in a main and/or secondary memory, and executed by one or more processors (controllers, or the like) to cause the one or more processors to perform the functions of the invention as described herein. In this document, the terms "machine readable medium," "computer-readable medium," "computer program medium," and "computer usable medium" are used to generally refer to media such as a random access memory (RAM); a read only memory (ROM); a removable storage unit (e.g., a magnetic or optical disc, flash memory device, or the like); a hard disk; or the like.

The foregoing description of the specific embodiments will so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

What is claimed is:

1. A system for creating and sending letters to inmates, the system comprising:
a server comprising at least one processor coupled to memory, the at least one processor being configured to:
initiate a letter creation session;
generate a front end for the letter creation session;
present the front end on a first client device via a web-based application, the front end comprising a user interface that is configured for presentation to a user of the first client device to generate digital letter data, the front end being configured to:
identify information about an inmate as inputs from a user of the first client device;
present an editor display for entering text for the digital letter data during the letter creation session and presenting a real-time page count estimate based on the entered text;
generate and present a preview of a digital letter based on the digital letter data input by the user of the first client device, the preview comprising:
a content of the digital letter generated based on the received digital letter data;
inmate details generated based on the received identifying information;
an accurate page count for the digital letter; and
a price corresponding to the page count; and
receive an indication of acceptance of the preview from the user of the first client device;
display to the user of the first client device past purchases of letters by the user;
receive, from the first client device via the front end, based on the indication of acceptance, the digital letter data as entered on the first client device during the letter creation session and the identifying information about the inmate;
store the digital letter data to a database;
determine a facility location corresponding to the inmate based at least in part on the identifying information about the inmate;
generate a location administration interface, the location administration interface being configured for use by one or more users to access the database, review the content of the digital letter data, retrieve letters sent by the user and a list of letters received by the inmate, approve the content of the digital letter data, and submit the digital letter data that has been approved by the one or more users for printing at the facility location;
configure an automated alert if the inmate has received a certain volume of letters in a given time period;
provide the location administration interface to a second client device for presentation to the one or more users;
receive from the second client device an indication that the digital letter data is approved for printing; and
transmit the approved digital letter data and a command to a printer located at the facility location, the command instructing the printer to print the digital letter data.

2. The system of claim 1 wherein the front end includes a list of facility locations including the facility location.

3. The system of claim 1 wherein the identifying information includes an inmate name, identification number, and date of birth.

4. The system of claim 1 wherein the facility location comprises a correctional facility, a restrained environment, and/or a restricted-access location.

5. The system of claim 1 wherein the server is further configured to send email notifications to the client device indicating the digital letter data has been printed and delivered to the inmate.

6. The system of claim 1 wherein the server is further configured to assess a fee for printing the digital letter data and delivering the printed digital letter to an inmate recipient.

7. The system of claim 1 wherein the server is further configured to:
generate a centralized administration interface, the centralized administration interface being configured for use by an administrator to:
add facility locations;
administrate a plurality of facility locations;
add users for the centralized administrator interface;
add print destinations;
set defaults for each of the plurality of facility locations;
enable and disable review of digital letter data by the location administration interface at each facility location; and
configure permission controls for each user of the plurality of facility locations;
provide the centralized administration interface to a third client device associated with the administrator; and
receive, from the centralized administration interface, a selection by the administrator to disable review at the facility location.

8. The system of claim 1 wherein the location administration interface includes letter data search and filtering functionality.

9. A method, in a data processing system comprising a processor and a memory, for creating and sending letters to inmates, the method comprising:
initiating, by a server, a letter creation session;
generating, by the server, a front end for the letter creation session;
presenting the front end on a first client device via a web-based application, the front end comprising a user interface that is configured for presentation to a user of the first client device to generate digital letter data, the front end:
identifying information about an inmate as inputs from a user of the first client device;
presenting an editor display for entering text for the digital letter data during the letter creation session and presenting a real-time page count estimate based on the entered text;
generating and presenting a preview of a digital letter based on the digital letter data input by the user of the first client device, the preview comprising:
a content of the digital letter generated based on the received digital letter data;
inmate details generated based on the received identifying information;
an accurate page count for the digital letter; and
a price corresponding to the page count; and
receiving an indication of acceptance of the preview from the user of the first client device;

displaying to the user of the first client device past purchases of letters by the user;

receiving, by the server, from the first client device via the front end, based on the indication of acceptance, the digital letter data and the identifying information about the inmate as entered on the first client device during the letter creation session;

storing, by the server, the digital letter data to a database;

determining a facility location corresponding to the inmate based at least in part on the identifying information about the inmate;

generating, by the server, a location administration interface, the location administration interface being configured for use by one or more users to access the database, review the content of the digital letter data, retrieve letters sent by the user and a list of letters received by the inmate, approve the content of the digital letter data, and submit the digital letter data that has been approved by the one or more users for printing at the facility location;

configure an automated alert if the inmate has received a certain volume of letters in a given time period;

providing the location administration interface to a second client device for presentation to the one or more users;

receiving from the second client device an indication that the digital letter data is approved for printing; and transmitting, by the server, the approved digital letter data and a command to a printer located at the facility location, the command instructing the printer to print the digital letter data.

10. The method of claim 9 wherein the identifying information includes an inmate name, identification number, and date of birth.

11. The method of claim 9 wherein the facility location comprises a correctional facility, a restrained environment, and/or a restricted-access location.

12. The method of claim 9 further comprising sending email notifications to the first client device indicating the digital letter data has been printed and delivered to the inmate.

13. The method of claim 9 further comprising assessing a fee for printing the digital letter data and delivering the printed digital letter to an inmate recipient.

14. The method of claim 9 further comprising:

generating a centralized administration interface, the centralized administration interface being configured for use by an administrator to add facility locations, administrate a plurality of facility locations, add users for the centralized administrator interface, add print destinations, set defaults for each of the plurality of facility locations, and configure permission controls for each user of the plurality of facility locations; and providing the centralize administrator interface to a third client device for presentation to the administrator.

15. The method of claim 9 wherein the location administration interface includes letter data search and filtering functionality.

16. A method, in a data processing system comprising a processor and a memory, for creating digital letters to inmates, the method comprising:

receiving, by a server, user information and inmate details from a client device of a message sender;

initiating, by the server, a letter creation session by confirming the inmate details at a facility location, presenting on the client device, by the server, an editor display for entering at the client device text for the letter data during the letter creation session;

capturing, by the server, the text as entered at the client device during the letter creation session;

presenting on the client device, by the server, a real-time page count estimate based on the entered text while the message sender is entering the text for the letter data;

generating, by the server, letter data based on the text input in the editor display by the message sender;

saving, by the server, the letter data for the letter creation session to a database;

generating and presenting, by the server, a preview, the preview comprising:
 a digital letter generated based on the letter data and the inmate details;
 an accurate page count for the digital letter; and
 pricing corresponding to the page count;

receiving, by the server, a payment based on the pricing; and transmitting, by the server, the digital letter to the facility location.

17. The method of claim 16 wherein the method further comprises presenting at the client device past purchases of letters by the message sender.

18. The method of claim 16 comprising the server hosting a letter creation service.

19. The method of claim 18, comprising the server allowing the message sender to connect to the letter creation service after receiving login information from the message sender.

20. The method of claim 16 comprising the server determining whether letter creation is complete and, if letter creation is not complete, the server continuing to capture the text as entered by the message sender during the letter creation session.

* * * * *